US007150244B2

(12) United States Patent
Dawes

(10) Patent No.: US 7,150,244 B2
(45) Date of Patent: Dec. 19, 2006

(54) WINDOW ADAPTABLE PET DOOR

(76) Inventor: Charles J. Dawes, 424 Bellevue St., Marietta, OH (US) 45750

( * ) Notice: Subject to any disclaimer, the term of this patent is extended or adjusted under 35 U.S.C. 154(b) by 0 days.

(21) Appl. No.: 10/864,514

(22) Filed: Jun. 10, 2004

(65) Prior Publication Data

US 2005/0284401 A1 Dec. 29, 2005

(51) Int. Cl.
*A01K 1/035* (2006.01)

(52) U.S. Cl. ........................................................ 119/484

(58) Field of Classification Search ................ 119/484, 119/416, 421; 49/169, 170; 160/180, 222, 160/226, 227, 372

See application file for complete search history.

(56) References Cited

U.S. PATENT DOCUMENTS

| | | | | |
|---|---|---|---|---|
| 3,499,246 | A * | 3/1970 | Loukas | 49/169 |
| 3,654,733 | A | 4/1972 | Blackwell | |
| 3,985,174 | A | 10/1976 | Bricker | |
| 4,057,031 | A | 11/1977 | Williams et al. | |
| 4,323,883 | A | 4/1982 | Sowards | |
| 4,480,407 | A | 11/1984 | Needham et al. | |
| 4,760,872 | A | 8/1988 | Hale, Jr. | |
| 4,833,828 | A | 5/1989 | Gingrande | |
| 4,989,546 | A | 2/1991 | Cannaday | |
| D317,216 | S | 5/1991 | Cutrone | |
| 5,303,677 | A | 4/1994 | Jones | |
| 5,469,807 | A | 11/1995 | Kosmaczeska | |
| 5,475,369 | A | 12/1995 | Baker | |
| 5,522,344 | A | 6/1996 | Demurjian | |
| 5,842,438 | A * | 12/1998 | Messmer | 119/165 |
| 5,890,455 | A * | 4/1999 | Donchey | 119/484 |
| 5,946,855 | A * | 9/1999 | Miconi | 49/163 |
| 5,992,096 | A | 11/1999 | De La Cerda et al. | |
| 6,062,167 | A | 5/2000 | Soley | |
| 6,164,013 | A | 12/2000 | Ramsey | |
| 6,253,711 | B1 * | 7/2001 | Shibles | 119/484 |
| 6,385,909 | B1 * | 5/2002 | Marsh et al. | 49/169 |
| 6,453,847 | B1 | 9/2002 | Brooks | |
| 6,470,829 | B1 | 10/2002 | Spangler et al. | |
| 6,691,483 | B1 * | 2/2004 | Lethers | 52/455 |

FOREIGN PATENT DOCUMENTS

| | | |
|---|---|---|
| DE | 28 10 016 | 9/1979 |
| JP | 56-2776 | 1/1981 |

* cited by examiner

*Primary Examiner*—Son T. Nguyen
(74) *Attorney, Agent, or Firm*—Matthew A. Pequignot; Hall, Vande Sande & Pequignot, LLP

(57) ABSTRACT

The present invention relates to a pet door suitable for use in a window, and more particularly to a pet door having a substantially planar profile. In at least one embodiment, the pet door includes a frame which is cooperative with stationary side panels. The frame carries a moveable door through which an animal may enter and exit. Moveable side panels are housed within, and extendible from, the stationary side panels for securing the pet door within a window frame.

20 Claims, 2 Drawing Sheets

WINDOW ADAPTABLE PET DOOR

FIELD OF THE INVENTION

The present invention relates to a low profile pet door adapted for use in a window. More particularly, this invention relates to a portable, window installable pet door having a substantially planar profile which may be constructed from a variety of materials to achieve various functional and/or aesthetic purposes.

BACKGROUND OF THE INVENTION

The use of pet doors for permitting an animal to enter and exit a residence is known. Such known pet doors are commonly installed in an exterior door and are manufactured to accommodate animals of a variety of sizes. Typically, such pet doors are permanently installed in the exterior door by removing a section of the exterior door and installing the pet door in its place. Such installations therefore require irreparably altering the exterior door. However, this may not be desirable as exterior doors can be very costly, as they are typically constructed of solid wood or steel. Moreover, a pet door may only be needed for the limited period of time that the pet owner lives at the residence where the pet door is installed (e.g. in a rental property). Also, a pet owner may desire to remove the pet door on a temporary basis for security reasons.

Certain pet doors are known which do not require permanent installation. For example, U.S. Pat. No. 6,164,013 discloses a pet door which may be installed in the opening between a door frame and an ajar door. However, such a pet door prevents use of the house door to which it is installed and is not suitable for use with an exterior door, which preferably remains closed when not in use for security reasons.

Therefore, pet doors not requiring permanent installation are needed. One attempt at providing for this need involves the use of pet portals in a window. Such portals afford the advantage of not requiring permanent installation and do not interfere with operation of a door. However, known pet portals for installation in a window do not blend well with the window into which they are installed and have other disadvantages. For example, U.S. Pat. No. 6,253,711 discloses a pet portal which may be installed in a window, but requires the pet to maneuver through a complicated U-shaped interior passageway in order to reach the exit. Such a portal may not be suitable for certain pets due to size and other physical limitations. Moreover, such a device does not fit entirely within the window frame but rather protrudes from the window, resulting in a awkward structure which may fall out of the window and may also present a hazard to those walking by. Such a device is also unsightly, relatively complicated to manufacture, is difficult to package, requires considerable inventory storage space, i.e. because of its box-like configuration), and does not blend well with windows or building structures.

Moreover, pet cages and litter boxes that may be installed in a window are also known, but do not permit ingress and egress of a pet from the building in which they were installed. Examples are set forth in U.S. Pat. Nos. 5,469,807; 5,522,344; and 5,842,438. These devices serve a specific, unrelated purpose and are also large, unsightly and do not blend well with the aesthetics of the windows into which they are installed.

Therefore, there exists a need in the art for a low profile pet door which does not require permanent installation and which permits a pet to enter and exit a structure at will. There further exists a need for such a pet door which blends well cosmetically with windows and building structures, is easy to install and uninstall, and which is easy to manufacture, store, package, and transport.

SUMMARY OF THE INVENTION

Figure 1:
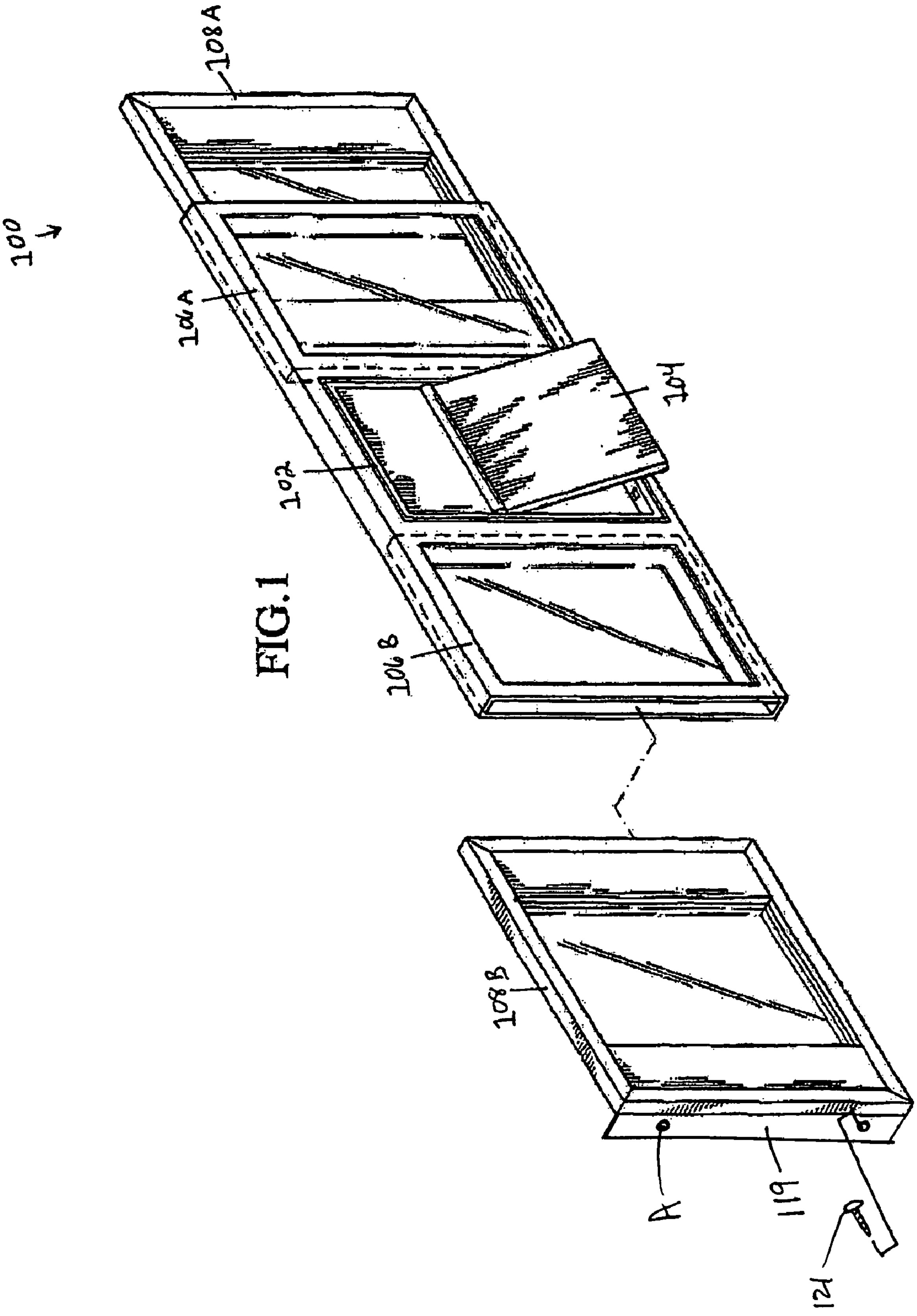
FIG. 1 illustrates one embodiment of a pet door according to the present invention.

The present invention relates to a pet door suitable for use in a window, and more particularly to a pet door preferably having a substantially rectangular and planar profile which may be constructed from a variety of materials to effect various functional and/or cosmetic purposes.

Generally speaking, the present invention is directed to a pet door capable of being selectively mounted onto a window frame. In a preferred embodiment, the pet door includes a window insertable frame, a moveable door attached to the frame, one or more stationary side panels in cooperation with the frame, and one or more extendible side panels housed substantially within the stationary side panels. The extendible side panels are extendible from within the stationary side panels and capable of engaging a window frame to secure the pet door onto the window frame. The pet door may include at least one member for securing the moveable door in a substantially stationary position, which may be a first magnet and a second magnet. The first magnet may be attached to the moveable door and the second magnet may be attached to or within the frame. The second magnet may be capable of moving axially towards the first magnet on the moveable door, to secure the moveable door in a substantially stationary position.

A pet door of the present invention further preferably has a substantially rectangular and low profile (e.g. a planar profile) and is capable of being transiently installed onto a window frame. Preferably, a pet door according to present invention has two stationary side panels and two extendible side panels housed within the two stationary side panels. The stationary side panels and extendible side panels may be constructed of any suitable material as desired and may define a framework enclosing, a for example, a plastic window, a Plexiglas® window, a glass window, or a screen. The pet door may also include a biasing (e.g. a spring) member for moving the extendible side panels.

In at least one embodiment the present invention is directed to a pet door capable of being mounted onto and/or within a window frame and comprises a frame, a moveable door (e.g. preferably flexible) attached to the frame, a first stationary side panel in cooperation with the frame, a second stationary side panel connected in plane with the frame, a first extendible side panel at least partially housed within the first stationary side panel, and a second extendible side panel at least partially housed within the secondary stationary side panel. The first extendible side panel and the second extendible side panel are extendible from within the first stationary side panel and the second stationary side panel, respectively, for securing the pet door onto a window frame. The pet door may also have additional features such as recited above or otherwise known in the art.

In a further embodiment of the present invention the pet door optionally includes, a first magnet attached to the moveable door and a second magnet attached to or within the frame. The extendible side panels are extendible from within the stationary side panels and capable of engaging a window frame to secure the pet door onto the window frame, and the second magnet preferably attached to or within the frame is capable of moving axially towards the first magnet on the moveable door, to secure the moveable door in a substantially stationary position.

DETAILED DESCRIPTION OF CERTAIN EMBODIMENTS

The present invention is directed towards a pet door for installation within a window frame. As such, the pet door generally comprises a frame having a moveable or swingable door attached to the frame, stationary side panels connected to the frame, and extendible side panels which may be partially housed within the stationary side panels and which are extendible therefrom. When the extendible side panels are extended from the stationary side panels, they are capable of engaging a window frame, thereby securing the pet door within the window frame. A biasing mechanism is optionally used to cause the extendible side panels to engage the window frame, thereby resulting in a tight seal between the pet door and the sides and bottom of the window frame. Furthermore, when the window is closed such that it engages the top of the pet door, a tight seal is created therebetween.

A pet door of the present invention preferably has a substantially rectangular and low thickness or profile, thereby permitting it to fit flush within the window to which it is installed. Also, because a pet door of the present invention does not extend substantially beyond the frame of the window, it does not present a danger of falling from the window due to uneven weight distribution. Furthermore, the profile of a pet door of the present invention provides advantages over known pet doors which include, but are not limited to, ease of manufacture, compact storage and packaging (due to the preferably planar configuration), & ease of transport, storage and owner and pet use.

In preferred embodiments of the present invention, a mechanism is included for securing the moveable door in a substantially stationary position when not in use. For example, the moveable door and the frame may each include a magnet. The magnet included in the moveable/swingable door may be attached to the bottom thereof, and the magnet included in the frame may be positioned within a groove or aperture in the frame. The magnet positioned within a groove is seated within the groove when the moveable door is in use. However, when the moveable door is not in use, the magnet positioned within the groove of the frame is drawn up from the groove through magnetic attraction to engage the magnet attached to the moveable door. In one embodiment, the magnet in the frame slides axially towards the magnet attached to the bottom of the moveable door, thereby rendering the moveable door substantially stationary until a threshold force is provided to the moveable door. Such a force will cause the magnetic seal to break, thus allowing the moveable door to swing freely. Such a force may be provided, for example, by an animal pushing against the moveable door.

Referring initially to FIG. 1, a pet door 100 of the present invention is shown. Pet door 100 includes a frame 102 to which is attached a moveable or swingable door 104. Frame 102 is housed or connected stationary side panels 106A and 106B. In preferred embodiments, frame 102 is contiguous with side panels 106A and 106B or, in alternative embodiments is a component which is attached to side panels 106A and 106B. Pet door 100 further includes one or more extendible side panels 108A and 108B which are housed at least partially within stationary side panels 106A and 106B, respectively, and are extendible therefrom. Preferably, stationary side panels 106A and 106B include channels within which extendible side panels 108A and 108B respectively slide in a substantially horizontal manner. Extendible side panels 108A and 108B are preferably biased from within stationary side panels 106A and 106B through the use of springs 114A and 114B (shown in FIG. 5), respectively. In at least one embodiment, when extendible side panels 108A and 108B are housed within stationary side panels 106A and 106B, springs 114A and 114B are kept in a substantially compressed state through a member (not shown) which locks extendible side panels 108A and 108B in place. Such a locking member may include a locking member on the interior or exterior of stationary side panels 106A and 106B, which is releasable by a user.

Figures 2, 3, 4, 5:
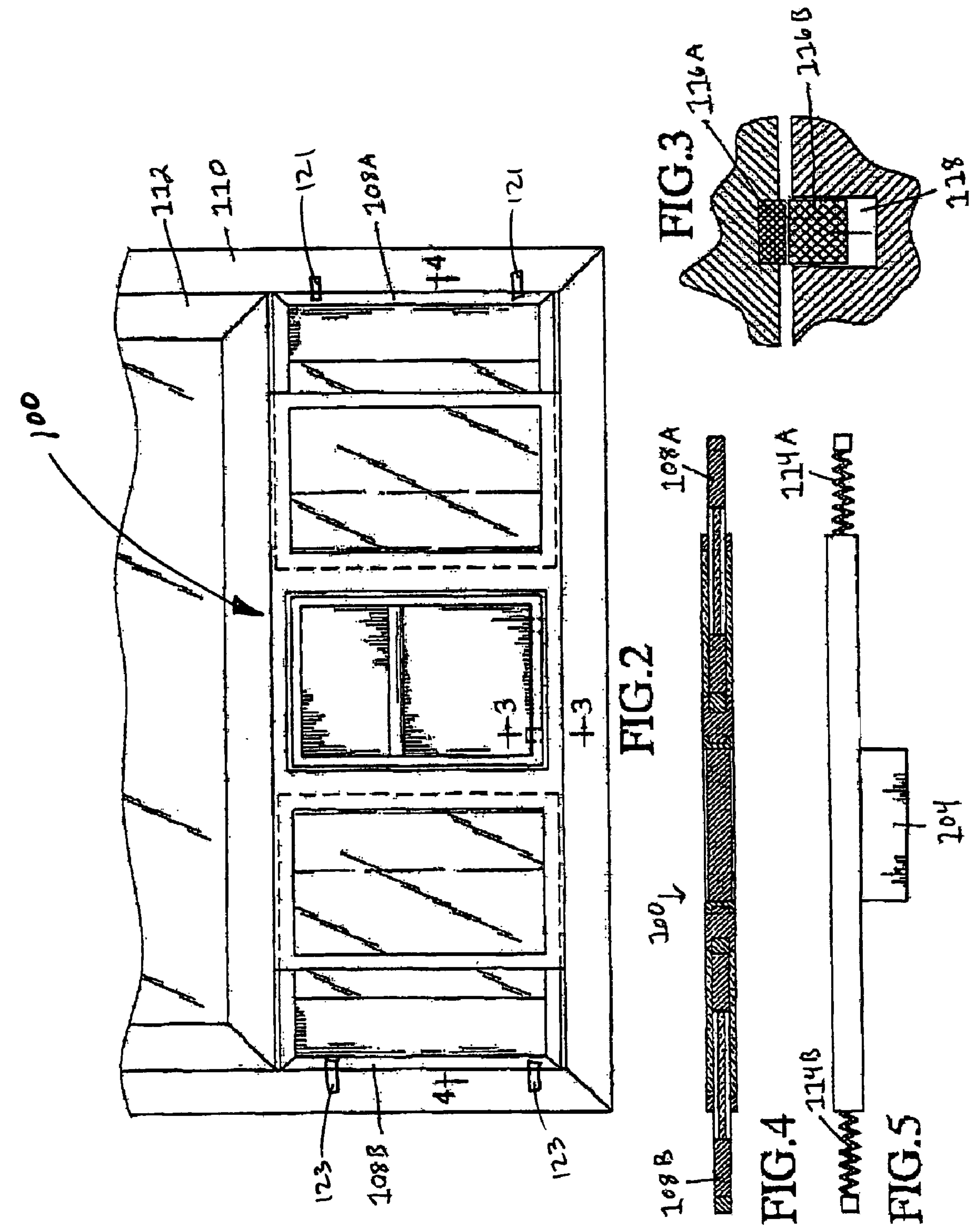
FIG. 2 illustrates a front view of the embodiment illustrated in FIG. 1 shown installed onto a window frame.
FIG. 3 illustrates one embodiment of a magnetic-type securing member used in a pet door according to the present invention to selectively secure the moveable portion of the pet door in a substantially stationary position.
FIG. 4 illustrates a top view of a pet door according to the present invention.
FIG. 5 illustrates an alternative embodiment of a pet door according to the subject invention employing accordion type side panes for extension and retraction.

A front view of a pet door 100 according to the present invention is shown in FIG. 2. In this figure, pet door 100 is shown installed within a window frame 110 with window 112 closed onto the top surface of pet door 100. Extendible side panels 108A and 108B are shown partially extended from stationary side panels 106A and 106B, respectively, to create a tight seal between extendible side panels 108A and 108B and window frame 110. When pet door 100 is seated onto the bottom of window frame 110, window 112 is closed such that it engages to top of pet door 100, and extendible side panels 108A and 108B are extended such that they engage the sides of window frame 110. When installed as such, a tight seal is formed between the perimeter of pet door 100 and window frame 110, such that the flow of air through the space enclosed by window frame 110 is substantially effectively prevented so as not to interfere with the building structures climate control systems. Accordingly, a pet door according to the present invention is well-suited for use in a window when loss of energy efficiency via the window unit is undesired. In order to further accomplish this, the perimeter of pet door 100, including stationary side panels 108A and 108B, may include a weather stripping material (e.g. of known type). It is noted, of course, that in embodiments which employ screen-type materials, air flow through the side panels would be the desired objective.

Referring now to FIG. 3, this figure, shows a mechanism for securing moveable door 104 in a substantially stationary position. Shown in FIG. 3 is a first magnet 116A attached to moveable door 104 and second magnet 116B within an aperture of the bottom of frame 102. One skilled in the art will recognize that second magnet 116B may otherwise be attached to frame 102 by other mechanism or in alternate configurations, so long as second magnet 116B is capable of engaging the magnetic field of first magnet 116A. In the present invention, it is preferred that second magnet 116B sits in a groove or aperture 118 such that when first magnet 116A on moveable door 104 is positioned proximately to second magnet 116B such that a magnetic field is create therebetween, second magnet 116B moves axially towards and contacts said first magnet 116A to secure moveable door 104 in a substantially stationary position. This magnetic field is disrupted when a threshold force is applied to moveable door 104, such as when an animal pushes thereon, which releases moveable door 104 and allows it to swing open. One skilled in the art will appreciate that the optional mechanism for securing moveable door 104 in a substantially stationary position need not be a magnet, but may be any material or mechanism which serves a similar purpose. For example, an electric locking mechanism may be employed which is released by way of a signal sent by a transmitter worn on the collar of an animal as the animal approaches the proximity of the door (see, for example, U.S. Pat. Nos. 4,497,133 and 6,141,911, which are incorporated in their entirety).

Turning now to FIG. 4 this figure shows a top view of a pet door 100 according to the present invention. As such, FIG. 4 illustrates that pet door 100 has a narrow width (e.g. a planar profile), making pet door 100 of the present invention well suited for placement onto window frame 110 (shown in FIG. 2) without displeasing aesthetic or uneven weight distribution which may otherwise render the unit unstable and create a hazardous condition. FIG. 5 shows an alternative embodiment in which accordion-type side panels 114A–B are employed as substitutes for the prior mentioned side wall structures. Such accordion-type panels are capable of extending and compressing thereby to effect installation or removal of door 100 respectively. In addition, FIG. 5 shows moveable door 104 in a position where it has swung open from frame 102.

One of skill in the art will appreciate that only one stationary side panel need be present in a pet door of the present invention. For example, only one stationary side panel could be used where it was desired to have the moveable door situated to one extreme end of the pet door. In such a case, only one extendible side panel, housed within and extendible from a single stationary side panel, would be needed to secure a pet door 100 onto a window frame 110. Moreover, a pet door 100 of the present invention is capable of being fabricated out of a variety of materials, such as, without limitation, metal, plastic, glass, screen, or wood. Furthermore, frame 102 and stationary side panels 106A and 106B may be machined out of a single piece of material or may be assembled from individual pieces.

Importantly, a pet door of the present invention is constructible from a variety of materials and in multiple configurations to permit the pet door to be used in a variety of conditions. For example, stationary side panels 106A and 106B and/or extendible side panels 108A and 108B may be an opaque material, such as solid plastic, metal or wood, in order to prevent viewing therethrough, or they may define frameworks for a plastic window, a glass window, a Plexiglas® window or a screen. For example, where window 112 is glass, it may be desired that stationary side panels 106A and 106B and/or extendible side panels 108A and 108B each comprise frameworks containing plastic windows, Plexiglas® windows or glass windows which are at least partially transparent, such that these panels are similar in appearance to window 112 and provide similar viewability as window 112.

Likewise, when a screen in installed (not shown) onto window frame 110, it may be desired that stationary side panels 106A and 106B and/or extendible side panels 108A and 108B comprise frameworks employing a screen material to permit air and sound flow through window frame 110. Even if a screen is not installed onto widow frame 110, it still may be desirable to fabricate extendible side panels 108A and 108B from a screen in order to permit such air and sound flow. Of course, stationary side panels 106A and 106B and/or extendible side panels 108A and 108B do not each have to be of the same material, but it is expected that a user would desire to have each be of the same material in order to have a uniform appearance and function for the window unit. Moreover, the present invention may be provided as a kit with more than one stationary and extendible side panel material, thereby allowing a user to change the materials as needed to accommodate changing weather conditions.

Moveable or swingable door 104 may be constructed of any suitable material. For example, it may be made of rubber, vinyl, hard plastic, other synthetic material or metal. Moreover, frame 102 may include a means for accepting a hard divider of any suitable material which may be positioned within frame 102 to completely block entrance and exit therethrough, such as when a user does not want a pet to enter or exit a structure or for security purposes. Moreover, moveable door 104 may be constructed to be selectively operable unidirectionally, such as when the user desires only to have a pet move through the door in one direction but not another.

As discussed above, a pet door according to the present invention is uniquely fabricated, preferably in a substantially planar configuration, for use on a window frame. The rectangular and low profile of the inventive pet door permits it to be easily situated onto a window frame where the extendible side panels engage the sides of the window frame to create a tight seal therebetween. In doing so, the present invention is uniquely suited for use with a window unit, where energy efficiency is important. Moreover, the ability of the extendible side panels to retract into the stationary side panels, in addition to the rectangular and low profile, permits a pet door of the present invention to be easily transported, packaged, and stored. This is very important during the manufacturing and inventory process, as well as in the user's residence. The ability of the unit to be transiently installed in a window unit permits use of the pet door in a window unit without requiring permanent and expensive alteration thereof. It also permits the pet door to be completely removed from the window unit when not in use which may be very important for security purposes.

EXAMPLE

In one prophetic example of the present invention, pet door 100 is installed in a window of a residence. In this example, pet door 100 employs extendible side panels 108A and 108B substantially housed-within stationary side panels 106A and 106B, respectively. Biasing mechanisms (not shown) for effecting are locked in a compressed state. Moveable door 104 rests vertically within frame 102 and is in a stationary closed position due to the magnetism created between first magnet 116A and second magnet 116B. A user wishing to install pet door 100 opens window 112 to a height within window frame 110 which is greater than the height of pet door 100. The user then releases the locking mechanism which holds the biasing mechanisms in a compressed state, thereby permitting extendible side panels 108A and 108B to extend from within stationary side panels 106A and 106B.

Thereafter, the user should adjust pet door 100 to ensure that it is seated firmly against the sides and bottom of window frame 110 and then lower window 112 such that it contacts the top of pet door 100, creating a tight seal therebetween.

With pet door 100 now in place, a pet, such as a cat or small dog, can enter the door by simply exerting a force against moveable door 104. This force disrupts the magnetic force between first magnet 116A and second magnet 116B, thus causing second magnet 116B to drop into groove or aperture 118 in frame 102 and allowing moveable door 104 to swing open, permitting the cat to exit (or enter) the residence.

When a user desires to remove pet door 100 from window frame 110, the process described above is simply performed in reverse order. Afterwards, pet door 100 is capable of being readily transported and stored due to its small form factor and light weight. In preferred embodiments, door 100 can be stored or packaged flat due to its planar nature.

The particular nature of pet door 100, in preferred embodiments, ensures that the door can be easily removed from the window in which it is installed. Therefore, in at least one alternative embodiment thereof, a security device is utilized in conjunction with the subject pet door. For example, in at least one preferred embodiment employing a security device therewith (see FIGS. 1 and 2), a flanged member 119 may be included attached (e.g. either rigidly or via a hinge) to each of side panels 108A–B (only one being shown for sake of clarity). In such a preferred embodiment, each flanged member 119 includes one or more apertures "A" through which fasteners 121 and 123 (e.g. screws or nails) can be inserted and affixed to a portion of the window sill or frame 110. When attached using fasteners 121 and 123 as such, with access to the fasteners (preferably) effectively limited to the interior of the building structure, door 100 cannot be easily removed by a prospective intruder, for example. Alternative embodiments of additional security features are, of course, contemplated. For example, such embodiments might include low-profile tabs integral or connected to frame 102, or small brackets (e.g. L-shaped), any of which may contain apertures for installation of fasteners therethrough.

While the above invention has been described in connection with specific embodiments thereof, it is understood that further modifications or embodiments are contemplated and this application is intended to cover any variations, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims. All references cited herein are expressly incorporated in their entirety.

What is claimed is:

1. A pet door capable of being mounted onto a window frame, said pet door consisting of:

a. a substantially planar frame oriented in a first plane;

b. a moveable door attached to said frame;

c. one or more substantially planar stationary side panels connected to said frame and oriented in an orientation substantially parallel to said first plane, and d. one or more substantially planar extendible side panels housed at least partially within said stationary panels and said pet door beinq capable of engaging a window frame to secure said pet door onto said window frame, said one or more substantially planar extendible side panels being oriented in an orientation which is substantially parallel to said first plane.

2. A pet door of claim 1, wherein said pet door has a substantially rectangular and low profile.

3. A pet door of claim 1, wherein said pet door is capable of being transiently installed onto said window frame.

4. A pet door of claim 1, wherein said one or more substantially planar stationary side panels is two side panels.

5. A pet door of claim 4, wherein said one or more substantially planar extendible side panels is two planar extendible side panels.

6. A pet door of claim 1, wherein said stationary side panels are opaque.

7. A pet door of claim 1, wherein said extendible side panels are opaque.

8. A pet door of claim 1, wherein said stationary side panels define a framework for enclosing a plastic window, a Plexiglas® window, a glass window or a screen.

9. A pet door of claim 1, wherein said extendible side panels define a framework for enclosing a plastic window, a Plexiglas® window, a glass window or a screen.

10. A pet door capable of being mounted onto a window frame, said pet door consisting of:

a. a frame;

b. a moveable door attached to said frame;

c. a first substantially planar stationery side panel connected to said frame;

d. a second substantially planar stationary side panel connected to said frame;

e. a first substantially planar extendible side panel at least partially housed within said first stationary side panel, and f. a second substantially planar extendible side panel at least partially housed within said secondary stationary side panel; and wherein said first substantially planar extendible side panel and said second substantially planar extendible side panel are extendible from within said first stationary side panel and said secondary stationary side panel, respectively, for securing said pet door onto a window frame; and wherein said pet door has a substantially planar configuration.

11. A pet door of claim 10, wherein said pet door has a subsLaritiaiiy rectangular and low profile.

12. A pet door of claim 10, wherein said pet door is capable of being transiently installed onto said window frame.

13. A pet door of claim 10, wherein said first stationary side panel and said second stationary side panel are opaque.

14. A pet door of claim 10, wherein said first extendible side panel and said second extendible side panel are opaque.

15. A pet door of claim 10, wherein said first stationary side panel and said second stationary side panel each define a framework enclosing a plastic window, a Plexiglas® window, a glass window or a screen.

16. A pet door of claim 10, wherein said first extendible side panel and said second extendible side panel each define a framework enclosing a plastic window, a Plexiglas® window, a glass window or a screen.

17. A pet door capable of being mounted onto a window frame, said pet door consisting of:

a. a substantially planar frame oriented in a first plane;

b. a mnoveable door attached to said frame;

c. a first member for securing said moveable door in a substantially stationary position and a second member for securing said moveabie door in a substantially stationary position;

d. one or more substantially planar stationary side panels connected to said frame and oriented in an orientation substantially parallel to said first plane;

e. one or more substantially planar extendible side panels housed at least partially within said stationary panels and said pet door being capable of engaging a window frame to secure said pet door onto said window frame, said one or more substantially planar extendible side panels being oriented in an orientation which is substantially parallel to said first plane, and f. one or more spring members for moving said extendible side panels.

18. A pet door of claim 17, wherein said first member for securinq said moveable door in a substantially stationary position is a first maqnet and said second member for securing said moveable door in a substantially stationary position is a second magnet.

19. A pet door of claim 18, wherein said first magnet is attached to said moveable door and said second magnet is attached to or within said door frame.

20. A pet door of claim 19, wherein said second magnet attached to or within said door frame is capable of moving axially towards said first magnet on said moveable door, to secure said moveable door in a substantially stationary position.

* * * * *